United States Patent
Johnson et al.

[11] Patent Number: 5,125,101
[45] Date of Patent: Jun. 23, 1992

[54] TRUNKING METHOD AND APPARAUTS FOR ESTABLISHING COMMUNICATION IN A TWO-WAY MOBILE RADIO SYSTEM

[75] Inventors: Edward K. Johnson, Yorktown Heights; Fred E. Stuebner, LaGrangeville, both of N.Y.

[73] Assignee: Etrunk Systems, Inc., Yorktown Heights, N.Y.

[21] Appl. No.: 481,974

[22] Filed: Feb. 16, 1990

[51] Int. Cl.$^5$ .............................................. H04B 7/26
[52] U.S. Cl. ...................................... 455/9; 455/34.2; 455/54.1
[58] Field of Search ............... 455/7, 9, 17, 32, 34–37, 455/54; 379/63

[56] References Cited

U.S. PATENT DOCUMENTS

| | | | |
|---|---|---|---|
| 4,013,958 | 3/1977 | Spayth | 455/32 |
| 4,360,927 | 11/1982 | Bowen et al. | 455/17 |
| 4,409,687 | 10/1983 | Berti et al. | 455/7 |
| 4,484,355 | 11/1984 | Henke et al. | 455/76 |
| 4,658,435 | 4/1987 | Childress et al. | 455/17 |
| 4,905,302 | 2/1990 | Childress et al. | 455/34 |
| 4,939,746 | 7/1990 | Childress | 455/33 |

OTHER PUBLICATIONS

Sales Brochure for Fujitsu Ten Model FTM-1-5-3092/FTM 40-3092, Fujitsu Ten Corp. of America, 1990.
System Manual for Fujitsu Intelligent Channel Access, Fujitsu Ten Corp. of America.
Installation manual for FJT 5003 Mobile Phone RTX Converstion, Fujitsu Ten Corp. of America.

Primary Examiner—Reinhard J. Eisenzopf
Assistant Examiner—Chi H. Pham
Attorney, Agent, or Firm—Sprung, Horn, Kramer and Woods

[57] ABSTRACT

A moble radio system is disclosed in which communication is established between at least two user-operable stations over one of a plurality of channels by operating the user-operable stations in accordance with the following steps:
(1) When in the receive mode (the push-to-talk switch is open):
 (i) incrementing the channel selector to select a channel;
 (ii) determining if a carrier signal is present on the selected channel:
 (iii) if a carrier signal is not present, returning to step (1) (i);
 (iv) if a carrier signal is present, determining if the selected trunk identification signal is present on the carrier signal;
 (v) if the selected trunk identification signal is not present, returning to step (1) (i); and
 (vi) if the selected trunk identification signal is present on the carrier signal, enabling said transmitter for push-to-talk operation.
(2) When in the transmit mode (the push-to-talk switch is closed):
 (i) if a carrier signal is present on the selected channel, incrementing the channel selector;
 (ii) if a carrier signal is not present on the selected channel, transmitting a carrier signal with the selected trunk identification signal for a prescribed period of time;
 (iii) determining whether a carrier signal with the selected trunk identification signal is received on the selected channel;
 (iv) if a carrier signal with the selected trunk identification signal is not received, returning to step (2) (i); and
 (v) if a carrier signal with the selected trunk identification signal is received, returning to step (1) (vi).

36 Claims, 7 Drawing Sheets

TRUNKING METHOD AND APPARAUTS FOR ESTABLISHING COMMUNICATION IN A TWO-WAY MOBILE RADIO SYSTEM

BACKGROUND OF THE INVENTION

The present invention relates to a two-way radio communication system of the type commonly known as "mobile radio". More particularly, the invention relates to a method and apparatus for establishing communication in such a system on a common radio communication "channel" or frequency selected from a plurality of such channels.

As used herein, the term "radio channel" is intended to include a first frequency for transmitting and a second, different frequency for receiving by a plurality of user-operable radio transmitter/receiver stations. Signals transmitted by such user operable stations at the first frequency are received by a nearby radio repeater station and then retransmitted at the second frequency for reception by all the user-operable stations in the vicinity that are tuned to the channel.

As used herein, the term "mobile radio" is intended to describe the type of two-way radio system commonly used to communicate between and among a plurality of mobile or portable transmitter/receiver stations and one or more fixed base transmitter/receiver stations, with the aid of a repeater station. The mobile or portable stations are arranged on mobile vehicles of all types, such as motor vehicles and boats, or hand held. A typical application of such a system is to dispatch and control the operation of taxis, tow vehicles, repair vehicles, delivery vehicles and the like. Normally, fleets of such mobile vehicles are owned and operated by separate business entities, and it is advantageous if all, or a subset of, vehicle operators in a common fleet or business are able to communicate with each other and with a dispatcher at a fixed base station. Such a set of users who can communicate with each other by means of the mobile radio system will be denoted hereinafter as a "group" of users. It is further advantageous if the vehicle operators and fleet dispatcher of one fleet or business (one group of users) are prevented from communicating with, either by transmitting to or receiving from, vehicle operators and dispatchers of other fleets or businesses (other groups of users). Thus, the mobile radio system advantageously operates as a "party line" within each group or subgroup of users, and "private line" as between groups or subgroups of users.

In two-way mobile radio communication systems of this type a plurality of radio channels are allocated for communication between al user-operable radio stations. Generally there may be, and usually are, many more radio stations than there are available radio channels in a given locality. Consequently, some arrangement is needed for enabling the communication among a large number of users, in the party line/private line basis described above, on a relatively small number of channels.

The U.S. Pat.No. 4,409,687 to Berti et al. describes an arrangement for establishing communication in a mobile radio environment which utilizes a "busy tone" in the middle of the voice band of each channel. Each user-operable station in the system scans the available channels, in either a "transmit mode" or "receive mode", and takes action in dependence upon the presence (or absence) of a busy tone. Each radio station utilizes a "notch filter" to remove the busy tone from the voice signal before the voice signal is processed. This arrangement is incompatible with other existing equipment in the field since it requires that all radio stations be able transmit, detect and remove a busy tone from the voice band in each channel.

Mobile radio systems, as presently in common use, distinguish between groups of users by so-called "sub-audible group tones"; that is tones in the voice band below 300 Hz. Such tones are variously called "CTCSS" and "DCSS" tones for "continuous tone coded squelch system" and "digital coded squelch system", respectively. In certain mobile radio channels in the United States—that is, in the radio channels allocated in the 450 to 470 MHz. range—there are a total of 38 CTCSS tones and 215 DCSS tones closely spaced in the frequency range between 65 and 250 Hz. The CTCSS tones are simply continuous tones whereas the DCSS tones repeatedly provide seven bit words that convey the identity of a group. Each mobile radio station includes equipment for detecting the presence of absence of selected CTCSS tones and/or for decoding the transmitted DCSS words. Although the use of CTCSS and DCSS tones is strictly voluntary on most frequencies, most mobile radios manufactured today are equipped to generate and detect one type of tone or the other, or both.

It is thus common practice to create "private lines" between groups of users, and "party lines" among groups of users, by selecting a CTCSS or DCSS tone on each separate channel. The CTCSS or DCSS tone need not be the same for each channel provided that the radio stations of all users in a given group have been assigned the same tone for each channel.

Channel selection in mobile radio systems of this type has traditionally been accomplished by manually adjusting the channel selector or by scanning. Automatic channel selection, for example as described in the aforementioned U.S. Pat. No. 4,409,687, has not been thought possible because of the complexity of the system environment that contains mobile radio stations which are not equipped to handle the "busy tone" format.

As used herein, the term "trunking", as used in the mobile radio environment, is intended to describe the automatic selection of an available channel, when in the transmit mode, and the automatic acquisition of a calling channel, when in the receive mode.

SUMMARY OF THE INVENTION

It is a principal object of the present invention to provide trunking in a mobile radio system, thereby to enable rapid, automatic access to an available communication channel, when in a transmit mode, and rapid, automatic call searching when in a receive mode.

It is another object of the present invention to provide a mobile radio system which ensures privacy in the communication among groups of users.

It is another object of the present invention to provide a mobile radio system which is secure against the reception of transmissions from third parties.

It is another object of the present invention to provide a mobile radio system which permits a two or even three-fold increase in the number of mobile radio stations in a given locality surrounding a repeater station.

It is another object of the present invention to provide a mobile radio system which does not cause interference when a mobile station set up for use within the reception area of one repeater station intrudes into the reception area of another repeater, wherein both repeaters operate in the same general reception area and one repeater is not part of the trunk system.

It is another object of the present invention to provide a mobile radio system which is entirely compatible with all existing equipment on the repeater frequency, whether or not it is part of the trunk system.

It is another object of the present invention to provide a mobile radio system which is fully licensable under the current rules of the United States Federal Communications Commission ("FCC").

It is another object of the present invention to provide a mobile radio system which enables each group of users to be subdivided into two or more subgroups so as to provide privacy between subgroups of users within each user group.

It is another object of the present invention to provide a mobile radio system which enables the user to select between different repeater stations or groups of repeaters located in different geographic areas.

It is another object of the present invention to provide an inexpensive and easily-installed, enhancement circuit board for existing radio equipment of the type wherein each user-operable station comprises:

(a) a radio transmitter;
(b) a radio receiver;
(c) a user-operable push-to-talk switch, coupled to the transmitter, for selectively enabling the transmitter to transmit a carrier signal;
(d) a carrier operable switch, coupled to the receiver, for indicating the receipt of a carrier signal;
(e) a channel selector, coupled to both the transmitter and receiver, for selecting the radio channel of operation;
(f) a tone generator, coupled to the transmitter, for continuously generating a selected one of a plurality of trunk identification signals, such as CTCSS tones or DCSS tones, which is associated with each given communication channel for transmission by the transmitter when operating on the given channel; and
(g) a decoder, coupled to the receiver, for indicating the presence of the selected one of a plurality of trunk identification signals when the receiver is operating on the given channel.

The above objects, as well as other objects and advantages which will become apparent in the discussion that follows, are achieved, in accordance with the present invention, by providing a mobile radio system of the type described immediately above in which communication is established between at least two user-operable stations over one of a plurality of channels by operating the user-operable stations in accordance with the following steps:

(1) When in the receive mode (the push-to-talk switch is open):
  (i) incrementing the channel selector to select a channel;
  (ii) determining if a carrier signal is present on the selected channel:
  (iii) if a carrier signal is not present, returning to step (1) (i);
  (iv) if a carrier signal is present, determining if the selected trunk identification signal is present on the carrier signal;
  (v) if the selected trunk identification signal is not present, returning to step (1)(i); and
  (vi) if the selected trunk identification signal is present on the carrier signal, enabling said transmitter for push-to-talk operation.

(2) When in the transmit mode (the push-to-talk switch is closed):
  (i) if a carrier signal is present on the selected channel, incrementing the channel selector;
  (ii) if a carrier signal is not present on the selected channel, transmitting a carrier signal with the selected trunk identification signal for a prescribed period of time;
  (iii) determining whether a carrier signal with the selected trunk identification signal is received on the selected channel;
  (iv) if a carrier signal with the selected trunk identification signal is not received, returning to step (2)(i); and
  (v) if a carrier signal with the selected trunk identification signal is received, returning to step (1)(vi).

This method of operation is preferably implemented by a programmed microprocessor arranged on a small circuit board. The microprocessor circuit receives as inputs the carrier operated switch or relay signal and the "mute/unmute" signal from the receiver. The carrier operated relay ("COR") indicates the presence of a carrier signal on the selected channel. The "unmute" signal from the receiver indicates the presence of the selected identification signal (CTCSS or DCSS tone) and unmutes the receiver when such tone is present.

The microprocessor circuit also receives a signal indicating whether the push-to-talk switch is open or closed.

The microprocessor circuit produces a pulse signal on an output line to increment the channel selector, as required. If incrementing by one, one pulse is produced; if incrementing by two or more channels, two or more pulses are produced, as required.

The microprocessor circuit also produces an output signal which enables the push-to-talk operation of the transmitter.

According to a preferred feature of the present invention, the user-operable mobile radio station includes a tone generator connected to the radio loudspeaker for producing one or more audible tones indicative of the station operation. In particular, and in accordance with this feature, a brief beep tone at one audible frequency is produced when the push-to-talk switch is keyed by the operator. A second brief beep tone at a second audible frequency is produced when the COR is activated as a result of keying the push-to-talk switch (i.e., when the repeater station receives the transmitted signal and transmits a carrier in reply). This second beep tone thus indicates to the user that the transmission by the user-operable station has been received by the repeater station and retransmitted for reception by all user-operable mobile radio stations in the area.

According to another feature of the present invention, a mobile radio station user can select a subgroup of users with whom he or she wishes to communicate. Preferably, the selection can be made by the length of time that the push-to-talk switch is initially keyed when establishing communication. If the push-to-talk switch is keyed momentarily, one subgroup is selected; and when the push-to-talk switch is keyed for a longer period of time, the second subgroup is selected. Preferably, an audible tone, such as a brief single beep, is produced when the push-to-talk switch is keyed for a short period, and a double beep tone or a tone of a different frequency is produced when the push-to-talk switch is keyed for a sufficiently long period to select the second subgroup.

The selection of one subgroup or another can be effected by a number of different methods. In one method, the trunk identification signal (e.g. CTCSS or DCSS tone) for transmission on the carrier signal when in the transmit mode is selected for the particular subgroup desired. According to another method, the available channels are allocated among the different subgroups so that each subgroup can transmit and receive only on certain select channels.

For example, the even channel numbers may be allocated to one subgroup and the odd channel numbers allocated to a second subgroup.

The group selection is thus effected by incrementing the channel selector a prescribed number of times to select only those channels for the subgroup desired.

In accordance with the present invention, therefore, the efficiency of mobile two-way radio systems that employ repeaters is improved by selecting one radio channel from a plurality of radio channels by systemmatic examination of each channel to determine the presence of: 1) A user of a desired group on the same system, 2) a user of a non-desired group on the same system, or 3) a user of a group from a foreign system that operates in the same geographic area on the same channel.

The system described in the aforementioned U.S. Pat. No. 4,409,687 is designed to operate on channel assignments that are geographically protected non-participating users.

In this known system a busy tone is provided to alert mobile stations to avoid that particular channel not transmitting a busy tone. This arrangement is designed to operate only where each and every mobile in a given system are participants in the system and share circuitry in each mobile that match the arrangement.

The Federal Communications Commission (FCC) issues special "trunking" licenses above 800 MHz. to operators of the type of trunking arrangements disclosed in the U.S. Pat. No. 4,409,687. However, all these prior arrangements have exclusive use of each of the channels trunked in a given geographic area. In this fashion, each system can only function in a given geographic area on an exclusive basis. It cannot operate in an environment with other non-participating mobiles, such as exists in the environment below 800 MHz.

The system according to the present invention provides not only a trunking arrangement but also allows other non-trunked users access to each channel and to each repeater in the arrangement.

The present system provides channel monitoring to any type of user, whether part of the system or not.

A user-operable station acquires a channel by an arrangement that analyzes the presence of any user and, if a channel is occupied, continues to examine each subsequent channel from the plurality of channels available in the system. At no point in this system are busy tones used, or is filtering required or used. in any equipment.

In the UHF spectrum (450–470 MHz.) for example, channels are licensed by the FCC on a non-exclusive use basis in a given geographic area. The present system is designed to operate in this "co-channel" environment. The system assures that mobile transmissions only occur on channels that are not currently occupied by either a mobile station that is part of the system, or by a mobile station from a foreign system on the same channel in the same area and, thus, not a part of the system.

The system according to the present invention is therefore designed to operate under current FCC rules and regulations on frequencies below 800 MHz.

The FCC channel assignments below 800 MHz. do not allow for exclusive use of any of the channels needed for trunking. Therefore, prior art systems in the United States cannot operate effectively or legally below 800 MHz. The present system, through careful analysis of each channel, recognizes non-system users and temporarily avoids selection of that channel. This arrangement makes "co-channel" trunking possible, and meets the legal requirements for channel monitoring applied to frequencies below 800 MHz.

The system according to the present invention also allows a gradual trunking process to take place. A non-trunking repeater can be added to the trunking arrangement and all the mobile stations previously operating on this repeater can gradually be converted to the trunking arrangement. This provides much more efficient use of existing channels and reduces the financial hardship for mobile users by allowing a conversion process to the trunking arrangement over a period of time. The system has the ability to allow both trunk and non-trunk users to share repeaters during this period of time.

The preferred embodiments of the present invention will now be described with the aid of the accompanying drawings.

DESCRIPTION OF THE PREFERRED EMBODIMENTS

Figure 1:
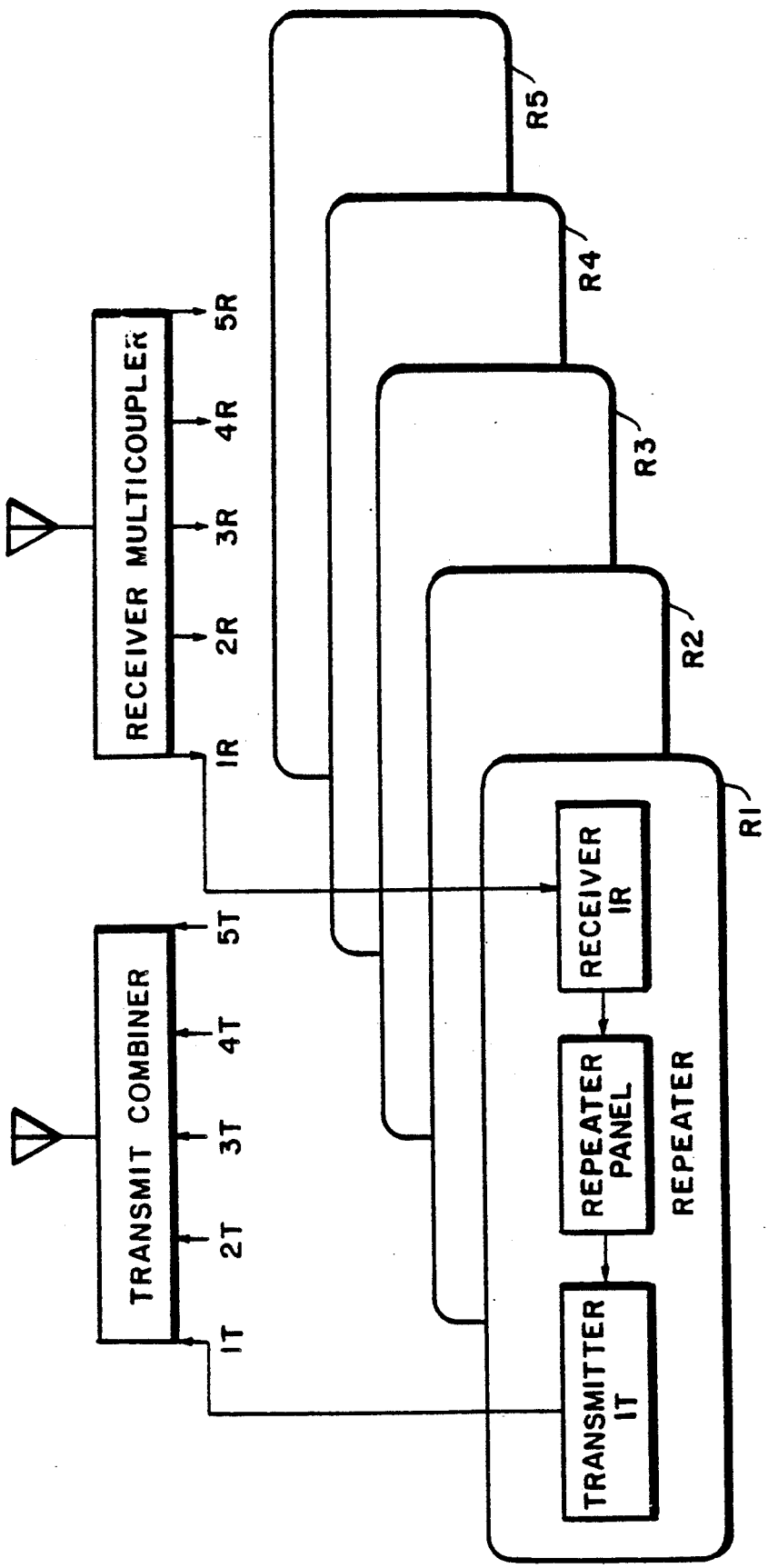
FIG. 1 is a block diagram showing a typical repeater station of a mobile radio system of the type to which the present invention relates.

The preferred embodiments of the present invention will now be described with reference to FIGS. 1-5 of the drawings. Identical elements in the various figures are designated with the same reference numerals. In describing these embodiments it will be assumed that a given locality surrounding a repeater station has been allocated five radio communication channels on a non-exclusive basis (for example, in the 450 to 470 MHz. range), each channel having a different radio transmitting frequency and radio receiving frequency. As will be understood from the description below, each channel may be shared with other licensed repeaters which are not part of the trunking system.

FIG. 1 illustrates a five channel mobile radio repeater station having five repeaters R1 through R5, one for each channel, located at a suitable site that provides good radio coverage. Each of the repeaters R1 through R5 includes a transmitter, a receiver, and a so-called "repeater panel" which will be described below. The repeaters share a transmitting antenna and a receiving antenna through the use of a signal combiner and multicoupler, respectively. For simplex operation in the first repeater R1, the receiver and receiving antenna would function on a frequency F1-R, and the transmitter and transmitting antenna would function on a frequency F1-T which is spaced from the frequency F1-R by a sufficient amount to provide good frequency separation for the transmitter and receiver. Other frequencies F2-R and F2-T through F5-R and F5-T would be provided for the repeaters R2 through R5. In the same locality, different groups of users may utilize the repeaters with the mobile radio stations (transmitters and receivers) in their respective mobile vehicles for example. Typically, each group has a common basis, such as the vehicles in a given business. Examples of such businesses are a taxicab company, a towing service and an oil company having a fleet of oil delivery trucks. The number of groups which a repeater can serve depends, among other things, upon the number of vehicles in a group, the amount of time a radio channel is used, and the number of repeater channels available. For example, five repeaters, each operating on separate transmit and receive frequencies, can serve as many as two thousand vehicles. However, the number of vehicles which can be efficiently served may change depending upon the demand for the channels.

The repeater panel of a given repeater station serves five basic functions:

(1) The panel validates the trunk identification signals, such as the CTCSS tones or DCSS tones, received on and demodulated from an incoming carrier to ensure that the received carrier was transmitted by a valid system subscriber;

(2) The panel keys or enables the transmitter whenever the received carrier comes from a valid subscriber;

(3) The panel strips the trunk identification signals from the received and demodulated carrier and generates new, clean trunk identification signals for transmission by the repeater;

(4) The panel suppresses noise and adjusts the level of the received audio signal for retransmission by the repeater; and (5) The panel monitors the incoming traffic and maintains a record of the subscriber activity, e.g., for billing purposes.

When the panel keys the transmitter (item (2), above) it causes the transmitter to transmit a carrier for a prescribed period of time after each validated incoming signal has terminated. This transmitter "hang time"—which may be approximately five seconds, for example—allows the system users to maintain control of a channel between individual transmissions from the mobile stations of a group.

The repeater station is normally arranged at an elevated position in the locality and transmits with greater power than the user-operable stations which it serves.

The repeater station, as described above, is well known in the art. A complete station with a repeater panel may be obtained commercially, for example, from ZETRON, Inc., in Belleview, Wash., USA, under the Model No. 38A. No modification of the repeater station is required for the purposes of the present invention.

Given a number of available repeater channels in a particular locality, it is desirable that a group of system users be able to quickly ascertain which channel or frequencies are available, so as to establish communication with the other users in that same group. The present invention provides a system (apparatus and method) for providing and establishing this communication in a relatively simple but reliable fashion.

Figure 2:
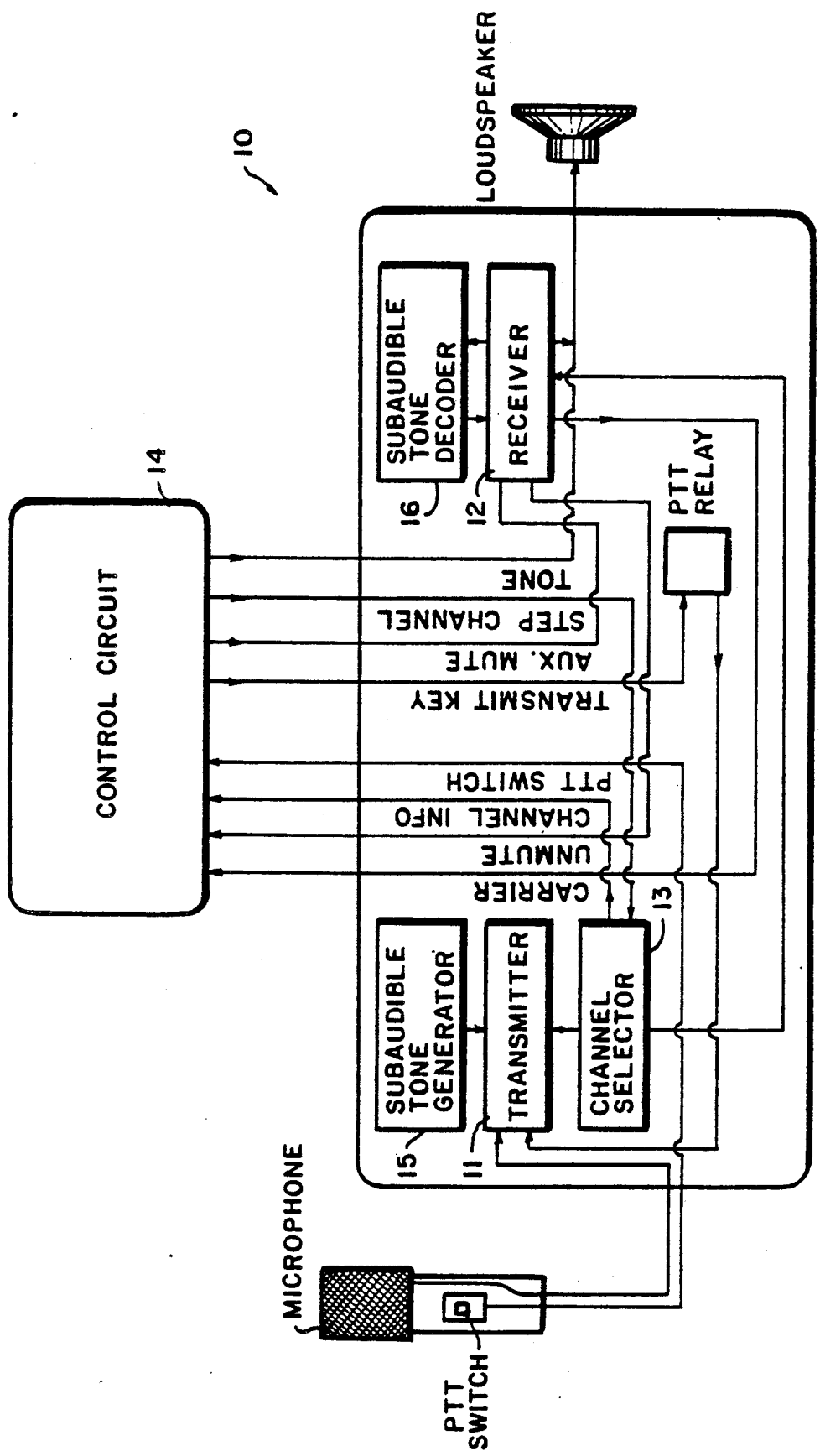
FIG. 2 is a block diagram of a typical mobile radio station having a control circuit in accordance with the present invention.

FIG. 2 illustrates a user-operable station according to a preferred embodiment of the present invention. This station may be a fixed base station, or a mobile station for use on a vehicle or boat, or a hand held unit. For simplicity, this user-operable station will hereinafter be called a "mobile station". The mobile station 10 includes a radio transmitter 11 capable of operating on any of the frequencies F1-R through F5-R, and a radio receiver 12 capable of operating on any of the frequencies F1-T through F5-T. Two frequencies are needed for each channel in order that the mobile stations and the repeater station can function in a simplex or push-to-talk arrangement. Thus, the mobile station 10 transmits on a repeater receive frequency (for example F1-R). A transmission on this frequency F1-R would be received by the repeater and retransmitted to the other mobile stations in the vicinity on the frequency F1-T. When transmitting, the other mobile stations would also use the frequency F1-R. In such an arrangement, a single antenna (not shown) is shared by the mobile station transmitter 11 and receiver 12, depending upon whether the mobile station is transmitting or receiving.

If full duplex operation were provided, four frequencies would be needed by each repeater for each channel.

It may be assumed that the transmitter 11 and receiver 12 are frequency modulation devices, although they may be amplitude modulation devices. The transmitter 11 includes an oscillator circuit which operates at one of the five frequencies depending upon the signal applied to it by a channel selector 13. The receiver 12 is preferably of the superheterodyne type and includes a local oscillator which also operates at one of the five frequencies depending upon the signal supplied by the channel selector 13. Channel select signals are provided by a control circuit 14 which will be described in detail hereinafter. The channel selector 13 is supplied with these channel select signals and sequentially produces frequency selection signals at its outputs. These selection signals are applied to the transmitter and receiver oscillators to cause the transmitter 11 to be sequentially operable on the radio frequencies F1-R through F5-R, and the receiver 12 to be sequentially operable on the radio frequencies F1-T through F5-T.

A sub-audible tone generator 15 and a sub-audible tone decoder 16 are provided, respectively, (1) for generating trunk identification signals, such as CTCSS or DCS tones, for transmission by the transmitter 11, and (2) for filtering and decoding such tones received by the receiver 12. These so-called "sub-audible tones" are not truly below the audible range; however, the receiver circuit includes a high-pass filter which allows only that audio signal to pass to the loudspeaker which is above the sub-audible tone range of 50–300 Herz.

The mobile station is provided with a microphone, connected to the transmitter 11, and a loudspeaker connected to the receiver 12. In addition, a push-to-talk switch, arranged on the microphone stem or separately situated, is electrically connected to the unit proper.

The mobile station also includes the usual operator controls and indicators (not shown) to enable the operator or user to operate his station and to have indications of the operation of his station. Such controls may include an on-off switch, a manual channel selector and indicator lights which inform the user of the selected channel.

As thus far described, the mobile radio station is well known in the art. Such a mobile station may be obtained commercially, for example, from the Radius Division of Motorola, Inc. in Schaumburg, Ill., USA, under the Model Nos. 206 or 214.

In a commercially available mobile radio the push-to-talk (PTT) switch is connected to a push-to-talk (PTT) relay 17 (either mechanical or electronic) which, in turn, keys the transmitter 11. In the preferred embodiment of the present invention, the line connecting the PTT switch to the PTT relay is interrupted and coupled to the control circuit 14 as shown in FIG. 2.

Other inputs and outputs of the control circuit 14 are connected to various available points in the radio in the manner shown in FIG. 2. These inputs and outputs are as follows:

Inputs: (1) the PTT switch; (2) the carrier operated relay (COR) signal indicating that a carrier is present; (3) the "UNMUTE" signal which indicates that a subaudible tone decode match is present; and (4) the channel signal (1 to 4 lines of various configurations depending on make and model of the radio), which identifies which channel the radio is presently tuned to. This fourth signal is only required when the system is programmed to select among subgroups in the manner described below.

Outputs: (1) transmit key; (2) channel step signal (a pulse which causes the radio to step to next channel); (3) auxiliary mute (to quiet the audio while stepping, etc., occurs); and (4) a tone signal (providing a tone or series of tones which inform the user of status, operation and errors).

Figure 3:
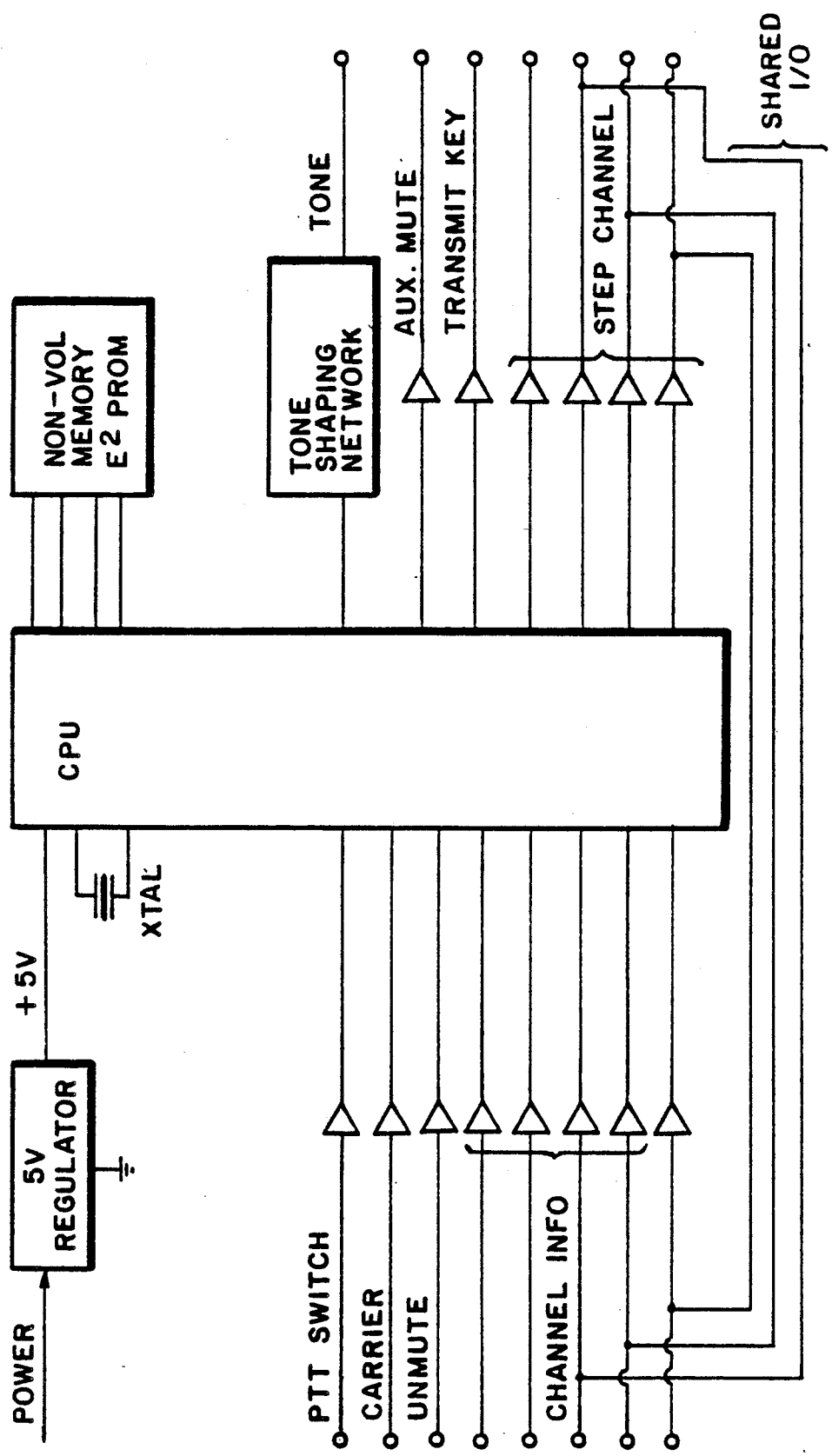
FIG. 3 is a detailed block diagram of the control circuit shown in FIG. 2.

FIG. 3 is a block diagram of the control circuit 14 itself. The CPU, a Hitachi 6301 microcomputer, has eight digital input lines, each with a protection circuit to prevent overloads. It also has six digital output lines, with open collector outputs, to drive the various functions in the radio. Three inputs share common connector pins with three outputs, only to keep the connector size within reason so as to fit within the smaller radios. One additional output of the CPU is the tone output. It has a tone shaping circuit to assist in generating suitable "beep" sounds.

The remainder of the circuitry consists of a nonvolatile memory (EEPROM), which configures the system, and a few support components such as a voltage regulator and a crystal.

FIGS. 4 and 5 illustrate the operation of the software stored and run in the CPU. Within the CPU, there are two "levels" of code. The first of these is called the background level, which has first priority. It operates a timer and counters which provide the necessary circuit timing. The CPU timing is derived from the crystal oscillator. The background level code generally consumes less than 2% of the available CPU time.

The second level of code, called the foreground level, is what is actually shown in the flowcharts of FIGS. 4 and 5. Beginning the upper left corner of FIG. 4, on the MAIN LOOP and coming down, the first block of the program is READ STATUS. At this point the CPU looks at the three digital input lines designated, respectively, CARRIER, UNMUTE and PTT. These three lines give eight possible conditions. Six of these are of concern, the other two being ignored. If one of the six conditions exists, then the program leaves the MAIN LOOP and goes to the selected routine. The receive mode routines are shown in FIG. 4; the transmit mode routines are shown in FIG. 5.

First we will consider the case of the receive or idle mode, (no PTT) in which the mobile station scans the channels for incoming messages.

Assume that the first channel that the CPU is on does not have a CARRIER and, consequently, does not have an UNMUTE. It will therefore exit the MAIN LOOP routine at the point marked NO CONDITIONS, going to a routine called REC000. Here the output line or lines called STEP CHANNEL are actuated for a few milliseconds (ms) to increment the channel number; thereafter, the CPU pauses for a prescribed period of time (e.g., 25 ms) to allow the radio to change channels and stabilize. After this delay, the CPU returns to the MAIN LOOP and looks at the status lines again. Assuming that a carrier is not received on this second channel, the CPU again steps the channel, waits 25 ms, and again looks for a carrier.

The CPU remains in this loop if none of the other stations are transmitting.

If a carrier is found, the CPU exits at the block marked CARRIER ONLY and goes to the routine REC100. It waits for a sufficient time (e.g., 250 ms) to allow an UNMUTE status to appear; that is, to allow the trunk identification signal (CTCSS or DCSS) to be decoded, if present. If UNMUTE has not appeared by the end of this 250 ms, the CPU returns to REC000 and proceeds as before.

If UNMUTE does appear with CARRIER, the CPU returns to the MAIN LOOP, exits at CARRIER and UNMUTE, and goes to the routine REC300. Here the radio is caused to stay on the selected channel as long as CARRIER and UNMUTE remain active. We would expect to receive a message at this time, as it is another station in the same group that is causing this CARRIER and UNMUTE by transmitting on the channel.

To summarize thus far: The CPU steps through the channels until it finds a CARRIER and, when an UNMUTE also appears, it stops stepping, opens the receiver and listens. When the CARRIER and/or UNMUTE disappear, the CPU goes back to stepping through the channels.

At this time, PTT is made available to allow the user to transmit as desired.

Next we will consider the case of the transmit or channel acquisition mode: CARRIER and UNMUTE are not present and the PTT key is depressed by the user. The object is to have all other stations in the user's group find and lock on to the user's transmitter.

Figure 5A:
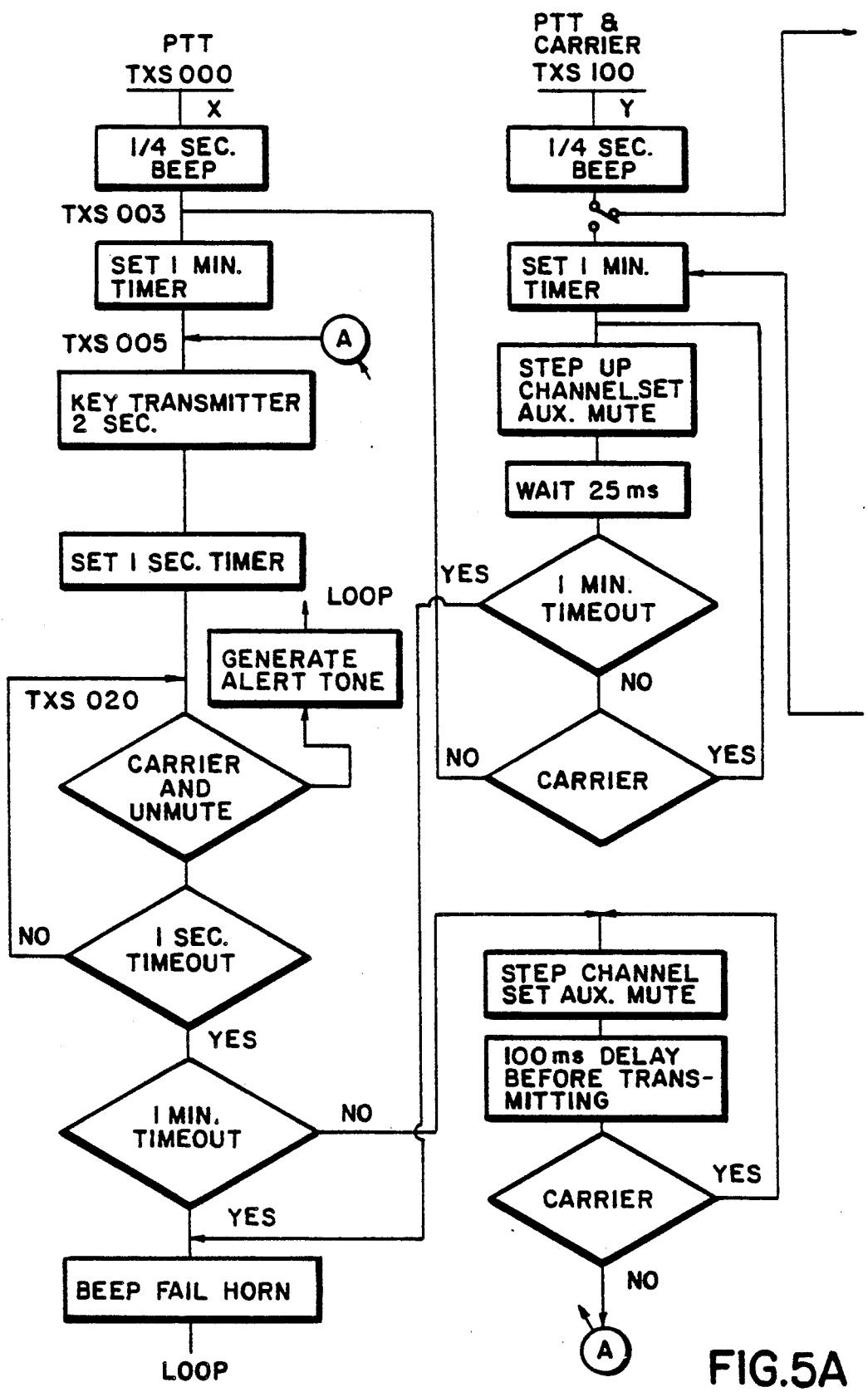
FIGS. 5A and 5B are flow charts of operational routines used in the algorithm represented by the flow chart of FIG. 4.

Starting at the MAIN LOOP, the CPU exits at PTT, going to the routine TSX000 (FIG. 5A). The CPU produces a responsive beep tone for ¼ second, letting the user know that the sequence has started. Next, the transmitter is caused to transmit a carrier for two seconds.

Note that the CPU could not come to this routine from the MAIN LOOP if a CARRIER were already present on the selected channel. Therefore, the station can only transmit on a vacant channel. In addition, and as will be discussed below, the user may choose to transmit on only selected ones of the available channels.

Next the CPU monitors CARRIER and UNMUTE for one second. If CARRIER and UNMUTE appear, the CPU produces a beep tone and returns to the MAIN LOOP. This beep tone indicates that the repeater has received, and has retransmitted the user's carrier.

If CARRIER and UNMUTE do not appear, the CPU steps the channel and transmits on the next selected channel. It keeps trying this procedure on successive selected channels for up to one minute until either a transmission is returned by a repeater or a failure tone is sounded.

If and when CARRIER and UNMUTE appear on a channel, the signal PTT keys the transmitter through the routine TXS300 (FIG. 5B) much as a normal transmitter, except that the station will not go back to the receive mode for a least 1 second after release.

Next we will consider the case where the transmitter is keyed when a CARRIER, but not an UNMUTE, is present. In this routine TXS100 (FIG. 5A) the station is not allowed to transmit, as the channel is occupied. Therefore, the CPU steps to the next selected channel, waits, and tests for a clear channel again.

In some instances, it may be desirable to limit channel selection to certain clusters of channels, so as to provide two or more subgroups within a group. An example of this situation is where a vehicle with a mobile radio travels between two cities that have different repeater stations tuned to different frequencies. As an example, assume there are a total of six channels, numbered 1 through 6, with three channels in one city and three in another.

Subgroup I could be allocated channels 1, 3 and 5, whereas subgroup II could be allocated channels 2, 4 and 6.

If, during channel request (PTT without CARRIER), the PTT is depressed for 1 second, enough for one response beep, subgroup I is selected; if PTT is held longer, two beeps are sounded and subgroup II is selected. Alternatively, a separate subgroup selector switch may be provided on the mobile unit to select between subgroup I and subgroup II.

The EEPROM stores the channels associated within the respective subgroups and otherwise configures the system. The CPU is thus caused to skip those channels which are not in the subgroup selected.

Another technique for selecting between subgroups is to select among different available trunk identification signals (CTCSS and/or DCSS tones). The EEPROM may be used to store the trunk identification signals for each subgroup, as required.

FIG. 5A illustrates the preferred embodiment of an algorithm for distinguishing between subgroups (indicated as groups 1, 2 and 3) by us of the PTT.

There has thus been shown and described a novel mobile radio communication system which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are intended to be covered by the invention which is limited only by the claims which follow.

What is claimed is:

1. In a two-way mobile radio communication system comprising a plurality of user-operable stations and a cooperating repeater station all operating on a plurality of radio communication channels differing frequency bands, each user-operable station comprising, in combination:

(a) a radio transmitter;
(b) a radio receiver;
(c) a user-operable switch means, coupled to said transmitter, for selectively enabling said transmitter to transmit a carrier signal;
(d) a carrier operable switch means, coupled to said receiver, for indicating the receipt of a carrier signal when in an activation position;
(e) a channel selector means, coupled to said transmitter and said receiver, for selecting the radio channel of operation;
(f) means, coupled to said transmitter, for continuously generating a selected one of a plurality of subaudible trunk identification signals associated with each given communication channel for transmission by said transmitter when operating on said given channel; and
(g) means, coupled to said receiver, for indicating the presence of said selected one of a plurality of subaudible trunk identification signals when said receiver is operating on said given channel;

the method of automatically operating the user-operable stations so as to establish communication between at least two such stations over one of said plurality of channels, said method comprising the steps of:

(1) when said user-operable switch means is open and said user-operable station is in a receive mode;
　(i) incrementing said channel selector means to select a channel;
　(ii) determining if said carrier operable switch means is in said activation position, thereby indicating that a carrier signal is present on the selected channel:
　(iii) if a carrier signal is not present, returning to step (1) (i);
　(iv) if a carrier signal is present, determining if the selected trunk identification signal is present on said carrier signal;
　(v) if the selected trunk identification signal is not present on said carrier signal, returning to step (1)(i); and
　(vi) if the selected trunk identification signal is present on said carrier signal, enabling said transmitter for push-to-talk operation; and
(2) when said user-operable switch means is closed and said user-operable station is in a transmit mode:
　(i) if said carrier operable switch means is in said activation position, thereby indicating that a carrier signal is present on the selected channel, incrementing said channel selector;
　(ii) if a carrier signal is not present on the selected channel, transmitting a carrier signal with the selected trunk identification signal for a prescribed period of time;
　(iii) determining whether a carrier signal with the selected trunk identification signal is received on the selected channel;
　(iv) if a carrier signal with the selected trunk identification signal is not received, returning to step (2)(i); and
　(v) if a carrier signal with the selected trunk identification signal is received, returning to step (1)(vi).

2. The method defined in claim 1, further comprising the step of producing an audible tone when said user-operable switch means is initially closed.

3. The method defined in claim 1, further comprising the step of producing an audible tone when said user-operable switch means is initially closed and said carrier operable switch is thereafter switched to said activation position.

4. The method defined in claim 1, further comprising the step of producing a first audible tone when said user-operable switch means is initially closed and producing a second audible tone when said carrier operable switch is thereafter activated.

5. The method defined in claim 4, wherein said second tone is different from said first tone.

6. The method defined in claim 1, further comprising the step of selecting said trunk identification signal for transmission on said carrier signal when in a transmit mode, thereby to select the group of users which are capable of receiving the transmission.

7. The method defined in claim 6, wherein said trunk identification signal is selected in response to said user-operable switch means.

8. The method defined in claim 7, wherein said user-operable switch means is a push-to-talk switch and wherein said subaudible trunk identification signal is selected in response to the length of time that said push-to-talk switch is initially closed.

9. The method defined in claim 6, further comprising the step of producing an audible tone indicative of the selected user group.

10. The method defined in claim 1, further comprising the step of incrementing the channel selector a prescribed number of times in step 2(i), thereby to select the group of users which are capable of receiving the transmission.

11. The method defined in claim 10, wherein said subaudible trunk identification signal is selected in response to said user-operable switch means.

12. The method defined in claim 11, wherein said user-operable switch means is a push-to-talk switch and wherein said subaudible trunk identification signal is selected in response to the length of time that said push-to-talk switch is initially closed.

13. The method defined in claim 10, further comprising the step of producing an audible tone indicative of the selected user group.

14. The method defined in claim 1, wherein said channel selector is incremented approximately every 25 milliseconds when in the receive mode when a carrier signal is not present on successive channels.

15. The method defined in claim 1, wherein said channel selector is incremented approximately every 250 milliseconds, when in the receive mode, when a carrier signal is present but the selected trunk identification signal is not present on successive channels.

16. The method defined in claim 1, wherein said user-operable switch means is a push-to-talk switch.

17. In a two-way mobile radio communication system comprising a plurality of user-operable stations and a cooperating repeater station all operating on a plurality of radio communication channels of differing frequency bands, each user-operable station comprising, in combination:
 (a) a radio transmitter;
 (b) a radio receiver;
 (c) a user-operable switch means, coupled to said transmitter, for selectively enabling said transmitter to transmit a carrier signal;
 (d) a carrier operable switch means, coupled to said receiver, for indicating the receipt of a carrier signal when in an activation position;
 (e) a channel selector means, coupled to said transmitter and said receiver, for selecting the radio channel of operation;
 (f) means, coupled to said transmitter, for continuously generating a selected one of a plurality of subaudible trunk identification signals associated with each given communication channel for transmission by said transmitter when operating on said given channel; and
 (g) means, coupled to said receiver, for indicating the presence of said selected one of a plurality of subaudible trunk identification signals when said receiver is operating on said given channel;
 the method of automatically operating the user-operable stations so as to establish communication between groups of such stations over one of said plurality of channels, said method comprising the steps of:
 (1) assigning prescribed ones of said subaudible trunk identification signals to respective groups of stations;
 (2) when said user-operable switch means is open and said user-operable station is in a receive mode;
  (i) incrementing said channel selector means to select a channel from among said prescribed channels;
  (ii) determining if said carrier operable switch means is in said activation position, thereby indicating that a carrier signal is present on the selected channel;
  (iii) if a carrier signal is not present, returning to step (1) (i);
  (iv) if a carrier signal is present, determining if the selected trunk identification signal is present on said carrier signal;
  (v) if the selected trunk identification signal is not present on said carrier signal, returning to step (2)(i); and
  (vi) if the selected trunk identification signal is present on said carrier signal, enabling said transmitter for push-to-talk operation; and
 (3) when said user-operable switch means is closed and said user-operable station is in a transmit mode:
  (i) if said carrier operable switch means is in said activation position, thereby indicating that a carrier signal is present on the selected channel, incrementing said channel selector to select a channel from among said prescribed channels;
  (ii) if a carrier signal is not present on the selected channel, transmitting a carrier signal with the selected trunk identification signal for a prescribed period of time;
  (iii) determining whether a carrier signal with the selected trunk identification signal is received on the selected channel;
  (iv) if a carrier signal with the selected trunk identification signal is not received, returning to step (3)(i); and
  (v) if a carrier signal with the selected trunk identification signal is received, returning to step (2)(vi).

18. The method defined in claim 17, further comprising the steps of assigning a first subset of said prescribed channels to a first subgroup and a second subset of said prescribed channels to a second subgroup within said group, and identifying one of said first and second subsets of channels for selection by a user-operable station, whereby each user-operable station within a group is operable on one of a plurality of subgroups.

19. The method defined in claim 18, wherein said user-operable switch means is a push-to-talk switch and wherein said identifying step comprises the step of determining the length of time that said push-to-talk switch is closed when said user-operable station is placed in a transmit mode.

20. The method defined in claim 19, further comprising the step of producing at least one tone, in response to the length of time that said push-to-talk switch is closed, indicative of the selected subgroup.

21. The method defined in claim 20, wherein said tone is a single beep to indicate selection of said first subgroup, and a double beep to indicate selection of said second subgroup.

22. The method defined in claim 17, wherein said user-operable switch means a push-to-talk switch.

23. The method defined in claim 17, further comprising the step of producing an audible tone when said user-operable switch means is initially closed.

24. The method defined in claim 17, further comprising the step of producing an audible tone when said user-operable switch means is initially closed and said carrier operable switch is thereafter switched to said activation position.

25. The method defined in claim 17, further comprising the step of producing an audible tone when said user-operable switch means is initially closed and producing a second audible tone when said carrier operable switch thereafter is activated.

26. The method defined in claim 17, wherein said second tone is different from said first tone.

27. The method defined in claim 17, further comprising the step of selecting said subaudible trunk identification signal for transmission on said carrier signal when in a transmit mode, thereby to select the group of users which are capable of receiving the transmission.

28. The method defined in claim 17, wherein said subaudible trunk identification signal is selected in response to said user-operable switch means.

29. The method defined in claim 17 wherein said user-operable switch means is a push-to-talk switch and wherein said subaudible trunk identification signal is selected in response to the length of time that said push-to-talk switch is initially closed.

30. The method defined in claim 17, further comprising the step of producing an audible tone indicative of the selected user group.

31. The method defined in claim 17, further comprising the step of incrementing the channel selector a prescribed number of times in step 2(i), thereby to select the group of users which are capable of receiving the transmission.

32. The method defined in claim 17, wherein said subaudible trunk identification signal is selected in response to said user-operable switch means.

33. The method defined in claim 17, wherein said user-operable switch means is a push-to-talk switch and wherein said subaudible trunk identification signal is selected in response to the length of time that said push-to-talk switch is initially closed.

34. The method defined in claim 17, further comprising the step of producing an audible tone indicative of the selected user group.

35. The method defined in claim 17, wherein said channel selector is incremented approximately every 25 milliseconds when in the receive mode when a carrier signal is not present on successive channels.

36. The method defined in claim 17, wherein said channel selector is incremented approximately every 250 milliseconds, when in a receive mode, when a carrier signal is present but the selected trunk identification signal is not present on successive channels.

* * * * *

REEXAMINATION CERTIFICATE (2198th)

United States Patent [19]
Johnson et al.

[11] B1 5,125,101
[45] Certificate Issued  Jan. 18, 1994

[54] TRUNKING METHOD AND APPARATUS FOR ESTABLISHING COMMUNICATION IN A TWO-WAY MOBILE RADIO SYSTEM

[75] Inventors: Edward K. Johnson, Yorktown Heights; Fred E. Stuebner, LaGrangeville, both of N.Y.

[73] Assignee: ET Software Systems, Inc., Elmford, N.Y.

Reexamination Requests:
No. 90/002,773, Jul. 6, 1992
No. 90/002,888, Nov. 13, 1992

Reexamination Certificate for:
Patent No.: 5,125,101
Issued: Jun. 23, 1992
Appl. No.: 481,974
Filed: Feb. 16, 1990

[51] Int. Cl.$^5$ .............................................. H04B 7/26
[52] U.S. Cl. ...................... 455/9; 455/34.2; 455/54.1
[58] Field of Search .................. 455/7, 9, 17, 32.1, 455/33.1, 34.1, 35.1, 36.1, 37.1, 54.1, 54.2, 34.2; 379/63

[56] References Cited

U.S. PATENT DOCUMENTS

| | | |
|---|---|---|
| 4,013,958 | 3/1977 | Spayth . |
| 4,347,625 | 8/1982 | Williams . |
| 4,360,927 | 11/1982 | Bowen et al. . |
| 4,409,687 | 10/1983 | Berti et al. . |
| 4,649,567 | 3/1987 | Childress . |
| 4,658,435 | 4/1987 | Childress et al. . |
| 4,682,367 | 7/1987 | Childress et al. . |
| 4,716,407 | 12/1987 | Borras et al. . |
| 5,040,237 | 8/1991 | Barnes et al. . |

OTHER PUBLICATIONS

John E. Raftis, "Tone control allows VHF,UHF trunking," Mobile Radio Technology, Apr. 1987 at 54–62.

Midland Land Mobile Radio E/PROM Programmer Operator's Manual, Manual Number: 70-999113.
Midland Syn-Tech VHF (Mid Band) Service Manual; Manual No.: 70-660880.

Primary Examiner—Reinhard J. Eisenzopf

[57] ABSTRACT

A mobile radio system is disclosed in which communication is established between at least two user-operable stations over one of a plurality of channels by operating the user-operable stations in accordance with the following steps:
(1) When in the receive mode (the push-to-talk switch is open):
  (i) incrementing the channel selector to select a channel;
  (ii) determining if a carrier signal is present on the selected channel:
  (iii) if a carrier signal is not present, returning to step (1) (i);
  (iv) if a carrier signal is present, determining if the selected trunk identification signal is present on the carrier signal;
  (v) if the selected trunk identification signal is not present, returning to step (1) (i); and
  (vi) if the selected trunk identification signal is present on the carrier signal, enabling said transmitter for push-to-talk operation.
(2) When in the transmit mode (the push-to-talk switch is closed):
  (i) if a carrier signal is present on the selected channel, incrementing the channel selector;
  (ii) if a carrier signal is not present on the selected channel, transmitting a carrier signal with the selected trunk identification signal for a prescribed period of time;
  (iii) determining whether a carrier signal with the selected trunk identification signal is received on the selected channel;
  (iv) if a carrier signal with the selected trunk identification signal is not received, returning to step (2) (i); and
  (v) if a carrier signal with the selected trunk identification signal is received, returning to step (1) (vi).

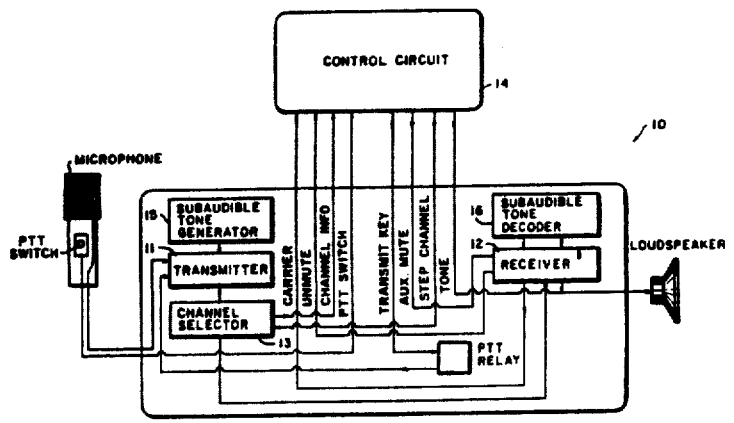

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Figure 4A:
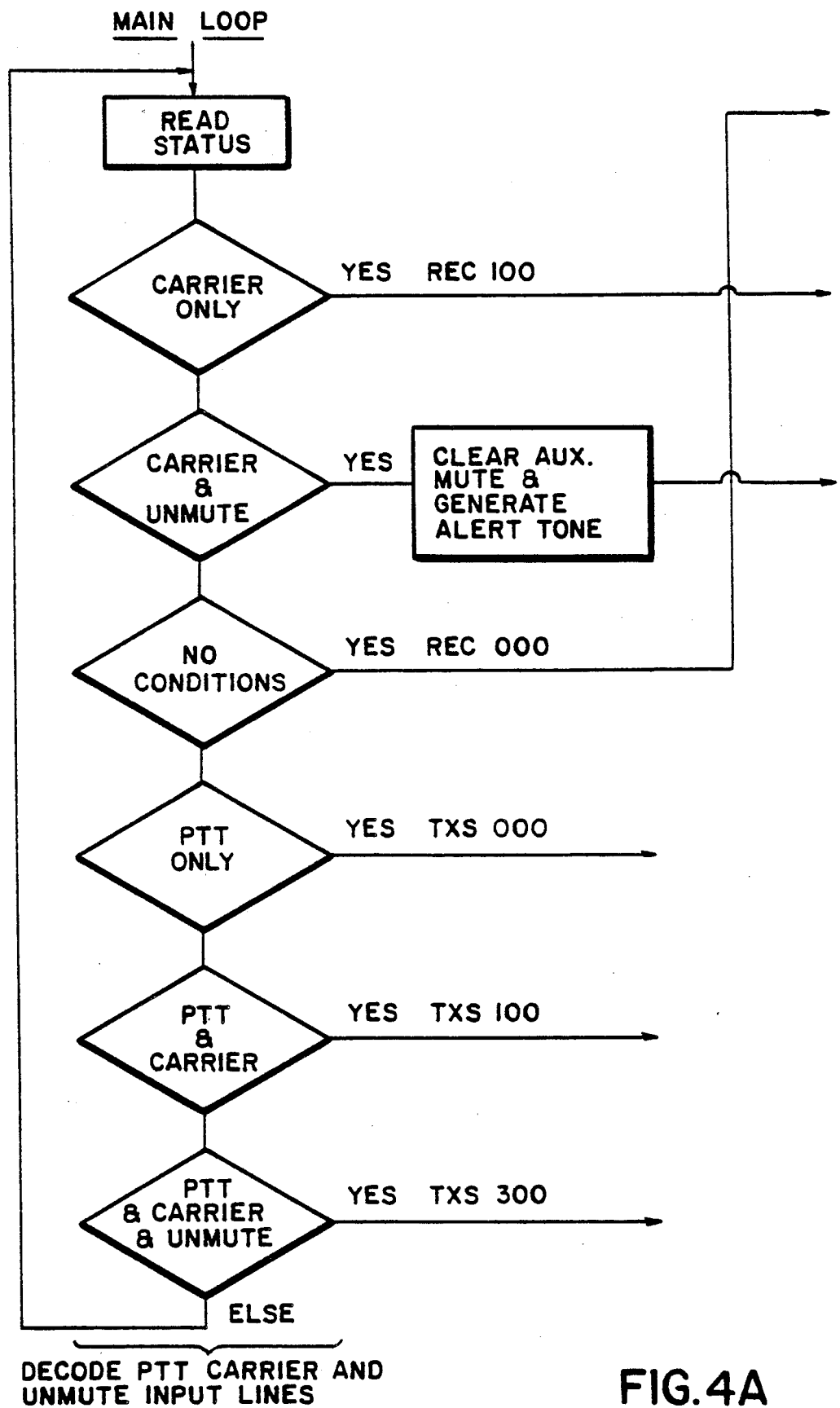
FIG. 4 is a flow chart showing the operation of the control circuit of FIG. 3.
Figure 4B:
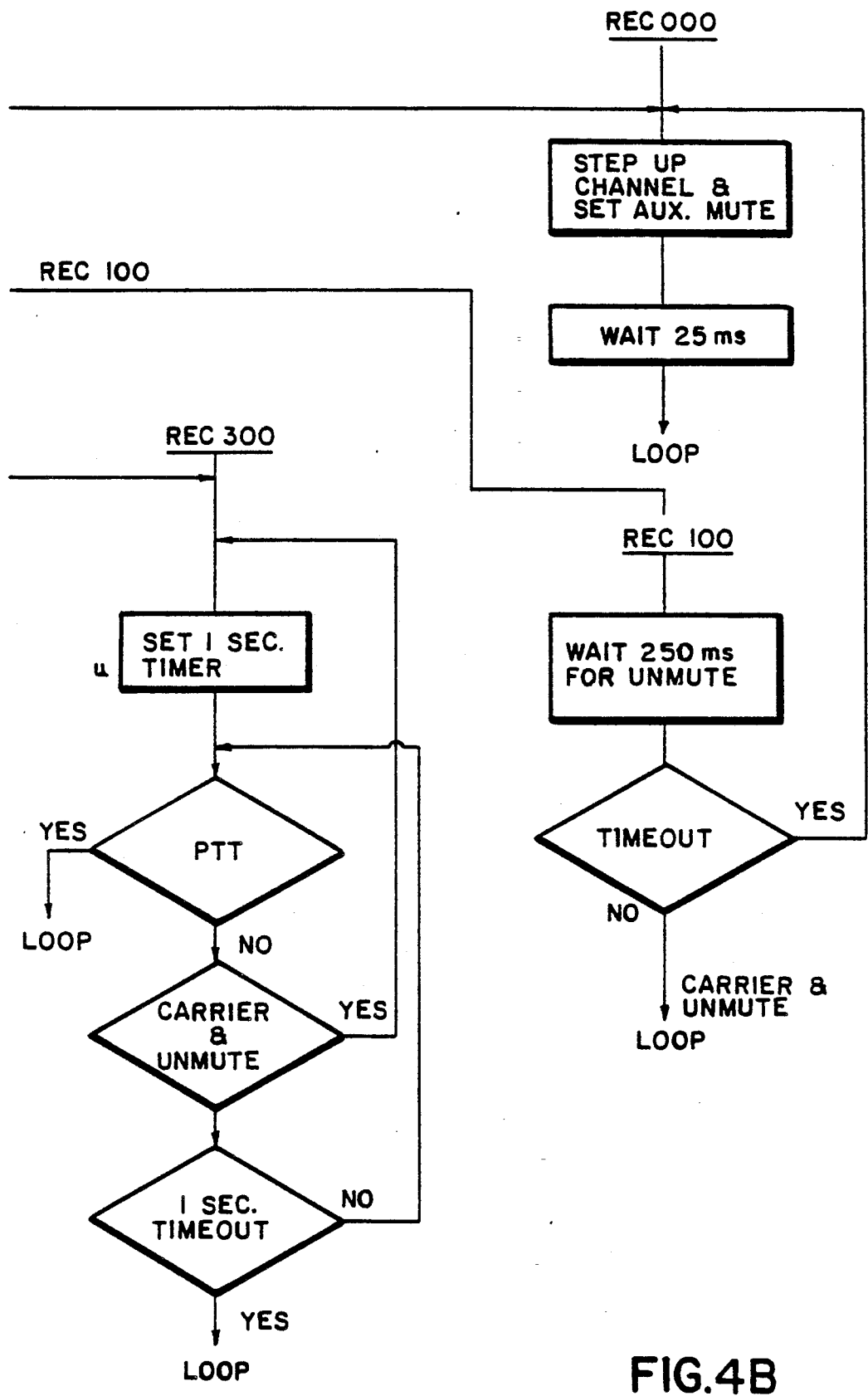
Figure 5B:
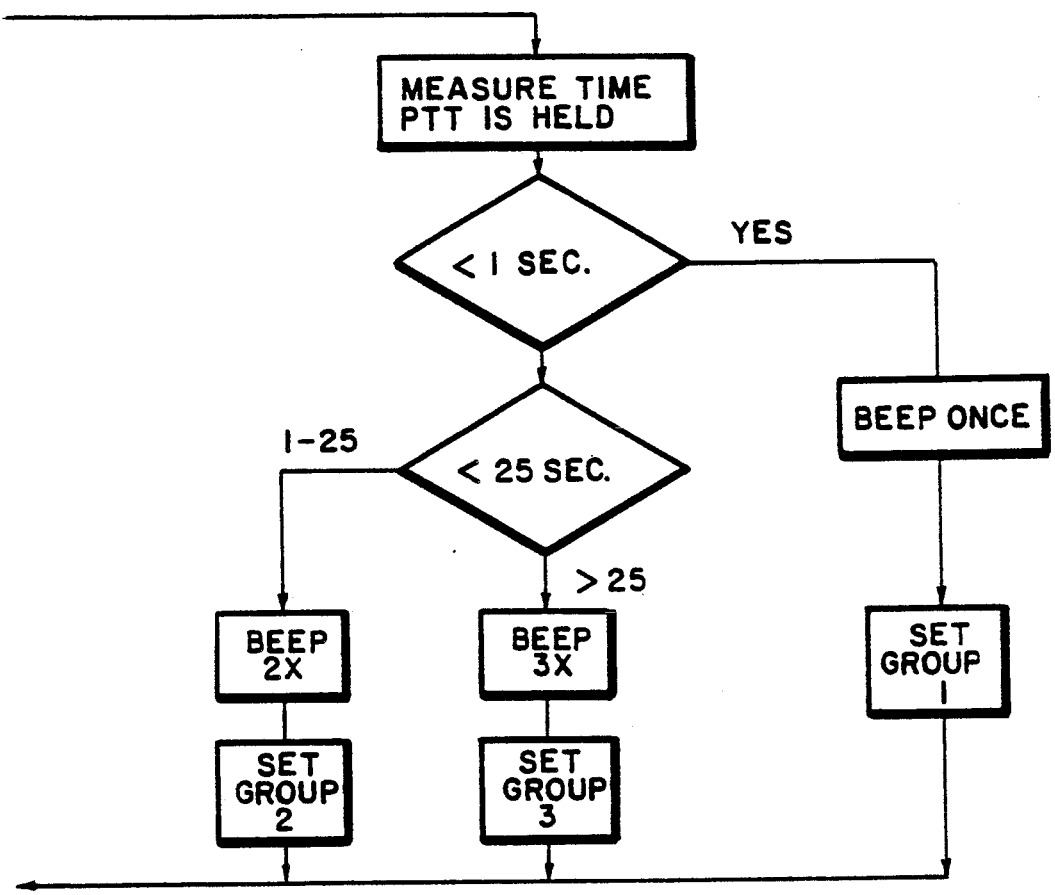
Figure 5C:
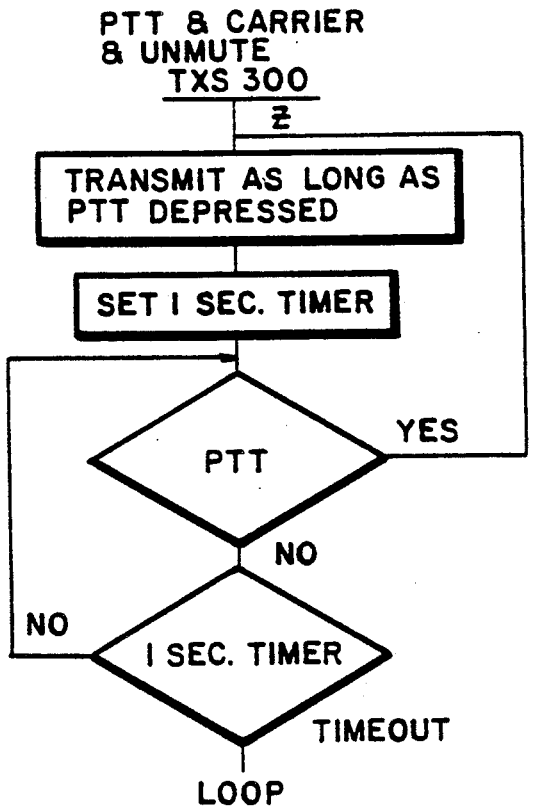

Column 6, Lines 40-44:
FIG. 4, *comprised of FIGS. 4A and 4B*, is a flow chart showing the operation of the control circuit of FIG. 3. [FIGS. 5A and 5B] *FIG. 5, comprised of FIGS. 5A, 5B and 5C* are flow charts of operational routines used in the algorithm represented by the flow chart of FIG. 4.

AS A RESULT OF REEXAMINATION, IT HAS BEEN DETERMINED THAT:

Claims 1, 17, 26, 28-30 and 32-34 are determined to be patentable as amended.

Claims 2-16, 18-25, 27 and 31, 35 and 36 dependent on an amended claim, are determined to be patentable.

1. In a two-way mobile radio communication system comprising a plurality of user-operable stations and a cooperating repeater station all operating on a plurality of radio communication channels *of* differing frequency bands *without a dedicated control channel*, each user-operable station comprising, in combination:
   (a) a radio transmitter;
   (b) a radio receiver;
   (c) [a] user-operable switch means, coupled to said transmitter, for selectively enabling said transmitter to transmit a carrier signal;
   (d) [a] carrier operable switch means, coupled to said receiver, for indicating the receipt of a carrier signal when in an activation position;
   (e) [a] channel selector means, coupled to said transmitter and said receiver, for selecting the radio channel of operation;
   (f) means, coupled to said transmitter, for continuously generating a selected one of a plurality of subaudible *digital coded squelch system (DCSS)* trunk identification signals associated with each given communication channel for transmission by said transmitter when operating on said given channel; and
   (g) means, coupled to said receiver, for indicating the presence of said selected one of a plurality of subaudible trunk identification signals when said receiver is operating on said given channel;
   the method of automatically operating the user-operable stations so as to establish communication between at least two such stations over one of said plurality of channels, said method comprising the steps of:
   (1) when said user-operable switch means is open and said user-operable station is in a receive mode[;]*:*
      (i) incrementing said channel selector means to select a channel;
      (ii) determining if said carrier operable switch means is in said activation position, thereby indicating that a carrier signal is present on the selected channel[:]*;*
      (iii) if a carrier signal is not present, returning to step (1) (i);
      (iv) if a carrier signal is present, determining if the selected *subaudible* trunk identification signal is present on said carrier signal;
      (v) if the selected *subaudible* trunk identification signal is not present on said carrier signal, returning to step (1) (i); and
      (vi) if the selected *subaudible* trunk identification signal is present on said carrier signal, enabling said transmitter for push-to-talk operation; and
   (2) when said user-operable switch means is closed and said user-operable station is in a transmit mode:
      (i) if said carrier operable switch means is in said activation position, thereby indicating that a carrier signal is present on the selected channel, incrementing said channel selector;
      (ii) if a carrier signal is not present on the selected channel, transmitting a carrier signal with the selected *subaudible* trunk identification signal for a prescribed period of time;
      (iii) determining whether a carrier signal with the selected *subaudible* trunk identification signal is received on the selected channel;
      (iv) if a carrier signal with the selected *subaudible* trunk identification signal is not received, returing to step (2) (i); and
      (v) if a carrier signal with the selected *subaudible* trunk identification signal is received, returning to step (1) (vi).

17. In a two-way mobile radio communication system comprising a plurality of user-operable stations and [a] *at least one* cooperating repeater station all operating on a plurality of radio communication channels of differing frequency bands *without a dedicated control channel*, each user-operable station comprising, in combination:
   (a) a radio transmitter;
   (b) a radio receiver;
   (c) [a] user-operable switch means, coupled to said transmitter, for selectively enabling said transmitter to transmit a carrier signal;
   (d) [a] carrier operable switch means, coupled to said receiver, for indicating the receipt of a carrier signal when in an activation position;
   (e) [a] channel selector means, coupled to said transmitter and said receiver, for selecting the radio channel of operation;
   (f) means, coupled to said transmitter, for continuously generating a selected one of a plurality of subaudible *digital coded squelch system (DCSS)* trunk identification signals associated with each given communication channel for transmission by said transmitter when operating on said given channel; and
   (g) means, coupled to said receiver, for indicating the presence of said selected one of a plurality of subaudible trunk identification signals when said receiver is operating on said given channel;

the method of automatically operating the user-operable stations so as to establish communication between groups of such stations over one of said plurality of channels, said method comprising the steps of:

(1) assigning prescribed ones of said subaudible trunk identification signals to respective groups of stations;

(2) when said user-operable switch means is open and said user-operable station is in a receive mode[;]:
 (i) incrementing said channel selector means to select a channel from among said prescribed channels;
 (ii) determining if said carrier operable switch means is in said activation position, thereby indicating that a carrier signal is present on the selected channel;
 (iii) if a carrier signal is not present, returning to step [(1) (i)] (2) (i);
 (iv) if a carrier signal is present, determining if the selected *subaudible* trunk identification signal is present on said carrier signal;
 (v) if the selected *subaudible* trunk identification signal is not present on said carrier signal, returning to step (2) (i); and
 (vi) if the selected *subaudible* trunk identification signal is present on said carrier signal, enabling said transmitter for push-to-talk operation; and (3) when said user-operable switch means is closed and said user-operable station is in a transmit mode:
 (i) if said carrier operable switch means is in said activation position, thereby indicating that a carrier signal is present on the selected channel, incrementing said channel selector to select a channel from among said prescribed channels;
 (ii) if a carrier signal is not present on the selected channel, transmitting a carrier signal with the selected *subaudible* trunk identification signal for a prescribed period of time;
 (iii) determining whether a carrier signal with the selected *subaudible* trunk identification signal is received on the selected channel;
 (iv) if a carrier signal with the selected *subaudible* trunk identification signal is not received, returning to step (3) (i); and
 (v) if a carrier signal with the selected *subaudible* trunk identification signal is received, returning to step (2) (vi).

26. The method defined in claim [17] *25*, wherein said second tone is different from said first tone.

28. The method defined in claim [17] *27*, wherein said subaudible trunk identification signal is selected in response to said user-operable switch means.

29. The method defined in claim [17] *28*, wherein said user-operable switch means is a push-to-talk switch and wherein said subaudible trunk identification signal is selected in response to the length of time that said push-to-talk switch is initially closed.

30. The method defined in claim [17] *27*, further comprising the step of producing an audible tone indicative of the selected user group.

32. The method defined in claim [17] *31*, wherein said subaudible trunk identification signal is selected in response to said user-operable switch means.

33. The method defined in claim [17] *32*, wherein said user-operable switch means is a push-to-talk switch and wherein said subaudible trunk identification signal is selected in response to the length of time that said push-to-talk switch is initially closed.

34. The method defined in claim [17] *31*, further comprising the step of producing an audible tone indicative of the selected user group.

* * * * *